US007005630B2

(12) United States Patent
Shin et al.

(10) Patent No.: US 7,005,630 B2
(45) Date of Patent: Feb. 28, 2006

(54) ENERGY-MODULATING FIBER GRATING SENSOR

(75) Inventors: Chow-Shing Shin, Taipei (TW); Chia-Chin Chiang, Keelung (TW)

(73) Assignee: National Taiwan University, Taipei (TW)

( * ) Notice: Subject to any disclaimer, the term of this patent is extended or adjusted under 35 U.S.C. 154(b) by 54 days.

(21) Appl. No.: 10/774,788

(22) Filed: Feb. 9, 2004

(65) Prior Publication Data

US 2005/0173623 A1    Aug. 11, 2005

(51) Int. Cl.
*G01J 4/00*    (2006.01)
*G01J 5/08*    (2006.01)
*G01J 1/42*    (2006.01)
*G01J 1/04*    (2006.01)

(52) U.S. Cl. ............................ 250/227.18; 250/227.14; 385/13; 356/32

(58) Field of Classification Search .......... 250/227.14, 250/227.16, 227.18, 227.23; 385/12–13, 385/31–32, 37; 356/32, 35.5, 73.1
See application file for complete search history.

(56) References Cited

U.S. PATENT DOCUMENTS 5,945,666 A * 8/1999 Kersey et al. ......... 250/227.14
6,822,218 B1 * 11/2004 Helmig et al. ......... 250/227.18
6,876,786 B1 * 4/2005 Chliaguine et al. ........... 385/13

OTHER PUBLICATIONS

Wang et al, "A torsion sensor made of a corrugated long period fibre grating", Apr. 3, 2001, Measurement Science and Technology, 12, 793-799.*

* cited by examiner

Primary Examiner—Stephone B. Allen
Assistant Examiner—Patrick J. Lee
(74) Attorney, Agent, or Firm—Perkins Coie, LLP

(57) ABSTRACT

This invention relates to a new technique of interrogating fiber grating sensors employed for measuring physical quantities such as temperature and force. The technique involves the edge filtering of transmitted light that occurs when a narrow bandwidth light of suitable wavelength from a laser source is passed through a Long Period Fiber Grating (LPFG). When the characteristics attenuation spectrum of the LPFG is shifting, an energy modulation effect will be achieved when one measures the intensity of the transmitted narrow bandwidth light. The narrow bandwidth strong light is best obtained by the reflection of a broad band light from a fiber Bragg gratings (FBGs). If the reflected narrow band spectrum from the FBGs is kept constant while the LPFG is subjected to temperature changes, applied loading or other type of suitable physical quantity changes, the characteristic transmission spectrum of the LPFG will shift according to the applied physical quantity, thus modulating the eventual transmitted light intensity. By transforming this intensity into a voltage signal, the variation of the physical quantity concerned can be deduced. Conversely, if the attenuation spectrum of the LPFG is kept constant and the FBG is subjected to temperature changes, applied loading or other type of suitable physical quantity changes, the same modulation effect will be achieved and the physical quantity concerned can likewise be monitored.

22 Claims, 6 Drawing Sheets

ENERGY-MODULATING FIBER GRATING SENSOR

TECHNICAL FIELD

This invention relates to a sensing system that employs the edge filtering effect of a long period fiber grating to match with the narrow band reflecting effect of a short period fiber grating to measure physical quantities such as temperature, twist angle, strain, and so on with high resolution and fast response. More particularly it relates to a high-sensitivity sensing system for measuring physical quantities, such as temperature and strain, that measures physical quantities with high resolution and fast response by employing photodiodes to transform a light signal into a voltage signal that is easily handled with a computer.

BACKGROUND

Temperature is an important basic physical quantity to measure, in engineering applications and research. The techniques for measuring temperature may be classified into contacting and non-contacting measuring.

The non-contacting method mainly deduces temperature according to radiant heat or a thermal image. Advantages of the non-contacting method include the capability of measuring a very high temperature without affecting the temperature of the subject concerned. However, the emissivity of the measured subject must be known beforehand, so a body with an unknown emissivity cannot be measured with the technique. Furthermore, the method is limited to measuring the surface temperature and the accuracy is not good (about ±10° C.). Moreover, the non-contacting technique is not suitable for measuring medium to low temperatures.

The contact measuring technique mainly employs a temperature probe to closely contact with a measured matter and deduces temperature according to a pre-calibrated relationship relating the physical characteristic of a probe to temperature. Common contact measuring sensors are gas thermometer, alcohol thermometer, mercury thermometer, thermocouple, thermistor, and resistance thermometer. An advantage of the contacting measuring is that the measuring position is at will. The drawbacks of gas/alcohol/mercury/thermometer are: 1. slow respond rate; 2. narrow measuring range; 3. low accuracy (about 0.5° C.); 4. automatic data acquisition is difficult. Moreover, a temperature of the measured matter may be changed due to the large heat capacity of the probe. Therefore, electrical thermometer, comprising thermocouple, thermistor, and resistance thermometer, is usually used in the industry. The accuracy of the thermistor, and resistance thermometer is high but the measuring range is narrow. Thermocouple is cheaper and has a wider measuring range, but its accuracy is lower (about 0.5° C.). In addition, the thermocouple uses dissimilar metal junctions to get the thermo-electromotive force for deducing the temperature. Problems of environment interaction and galvanic corrosion may arise and affect the stability of measurement. It is also prone to electromagnetic interferences, and is not suitable for use in the presence of ionizing radiation. A problem common to all conventional measuring technique is the impracticality of embedding the probes in a structure to measure interior temperature without affecting structural integrity.

With regard to measurements of the torsional force and axial force, the conventional arts may employ resistance strain gauge, piezoelectric sensor capacitance or an inductance. There are easily affected by electromagnetic interference and are difficult to be embedded into a structure to measure the interior strain without degrading the structure integrity. Other methods, such as: photoelasticity and optic interference/diffraction need to employ more complicated, expensive, and massive equipment and are difficult to automate. As a result, they are not convenient for practical engineering applications. Periodic variation of refractive index in the core of an optical fiber can be formed by side writing using a UV laser beam with a proper amplitude grating mask. The resulting long period fiber grating can attenuate specific wavelengths and is used as filter in optical communication applications. Long period fiber grating can also be manufactured by etching a fiber to give a corrugated surface with the correct period. The specific wavelengths that will be attenuated will vary with temperature and deformation of the fiber. By measuring the change in the characteristic attenuation wavelengths, physical quantities such as temperature variations, axial, transverse, and torsional deformation can be deduced.

On the other hand, a short period fiber Bragg grating will reflect a characteristic narrow band wavelength. This characteristic wavelength will also vary with temperature and fiber deformation and so can also be employed to measure these physical quantities.

At present, interrogating the wavelength shifts of the long period fiber grating and the short period fiber Bragg grating signals requires the use of complicated instrument, such as optical spectrum analyzer or Fabry-Pèrot interferometer. These instruments are expensive and the measuring rate is slow. It is difficult to employ these instruments to measure a fast changing physical quantity.

SUMMARY

In view of the limitation of related conventional arts, one object of this invention is to provide a high resolution, fast responding and low-cost interrogation system, that can measure small variations in temperature, strain, or other physical quantities that can affect the attenuation wavelength in the long period fiber grating or reflected wavelength in the fiber Bragg grating.

Another objective of the present invention is to provide a tiny sensor device (about 125 µm, smaller than conventional sensors) suitable for use in adverse environment that involves magnetic field, electromagnetic interference, and ionizing radiation. The sensor can also be embedded inside a material for smart structure applications.

As aforementioned, the present invention provides an energy-modulating fiber grating sensing system, comprising: a long period fiber grating to sense force, temperature or other physical quantities; a broadband light source; a fiber Bragg grating used to reflect a characteristic wavelength from the broadband light source to form characteristic narrow band reflection; a coupler between said broadband light source and said fiber Bragg grating to introduce the broadband light into said fiber Bragg grating and to channel the said characteristic narrow band reflection into the said long period fiber grating; and a light intensity measuring assembly to measure light energy coming through from the said long period fiber grating.

As aforementioned, the present invention also provides an energy-modulating fiber grating sensing system, comprising: a fiber Bragg grating for sensing force, temperature or other physical quantities and used to reflect light modulated by said physical quantities to form characteristic narrow band spectrum; a broad band light source; a long period fiber grating used to demodulate reflected light by said fiber Bragg grating; a coupler used to couple said broad band light into said fiber Bragg grating; and a light intensity measuring device to measure light energy that is reflected from said fiber Bragg grating and through said long period fiber grating.

As aforementioned, the present invention provides an energy-modulating fiber grating sensor, comprising: a long period fiber grating for sensing force, temperature or other physical quantities; a fixed wavelength narrow band light source; and a light intensity measuring assembly to measure light energy from said fixed wavelength narrow band light source and through said long period fiber grating.

The long period fiber grating will affect and attenuate some specific wavelengths, and the short period fiber Bragg grating will have selected narrow band reflection of specific wavelength. If a broadband light source is reflected by the fiber Bragg grating and passed through the long period fiber grating, energy of the resulting pass band will vary between zero to a maximum according to the relative position between the characteristic attenuation spectrum of the long period fiber grating and the characteristic reflected wavelength by the fiber Bragg grating.

If the reflected wavelength by the fiber Bragg grating is kept fixed, and the long period fiber grating is used as sensing device for physical quantities, such as temperature or force, the attenuation spectrum will shift with the variation in the measured physical quantities. This shift will produce a modulating effect on the narrow band light reflected from the fiber Bragg grating. The physical quantities, such as temperature or force, can then be deduced by measuring the resulting light intensity that passes through. Moreover, different kind of physical quantities can be measured by using suitable transducer mechanisms to transform the physical quantities into deformation or temperature and apply it to the long period fiber grating.

Alternatively, if the attenuation wavelength of the long period fiber grating is kept fixed, and the fiber Bragg grating is used as a sensing device for temperature or strain, the characteristic narrow band reflected wavelength will shift with the variation in the measured quantities. A modulating effect will again be produced to allow the physical quantities, such as temperature or force, to be deduced by measuring the resulting light intensity passing through. Moreover, different kinds of physical quantities can be measured by using a transducer mechanism to transform the physical quantities into deformation or temperature and applying it to the fiber Bragg grating sensor.

By using this energy-modulating setup and a suitable negative feedback actuator mechanism to control either the fiber Bragg grating, or the long period grating, it is possible to synchronize the characteristic attenuation spectrum with the characteristic reflected wavelength so as to lock on to the minimum light energy throughput. In this way, we can deduce the characteristic wavelength of either the long period grating or fiber Bragg grating, whatever is used as sensor, from the control parameter of the feedback mechanism. This control parameter can then be used to deduce the physical quantity that is to be measured.

BRIEF DESCRIPTION OF THE DRAWINGS

The foregoing aspects and many of the advantages of this invention will become more readily appreciated and better understood by reference to the following detailed description, when taken in conjunction with the accompanying drawings, where in.

DETAILED DESCRIPTION

Some sample embodiments of the invention will now be described in greater details. It should however be recognized that the present invention can be practiced in a wide range of other embodiments besides those explicitly described, and the scope of the present invention is expressly not limited except as specified in the accompanying claims.

The components of the different elements are not shown to scale. Some dimensions of the related components are exaggerated and meaningless portions are not drawn to provide a clearer description and easier comprehension of the present invention.

This energy-modulation sensing system employs a broadband light source. On encountering the fiber Bragg grating, a Bragg wavelength laser light will be reflected. When the reflected light is coupled to the LPFG, the later will act as an edge filter with its characteristic attenuation spectrum. The energy that passes through will be truncated to different extents, depending on the relative positions of the Bragg wavelength and attenuation spectrum. If the long period fiber grating is subjected to a change in physical quantities such as strain or temperature, its characteristic attenuation spectrum will shift. The degree of truncation will therefore vary according to the physical quantity measured, giving rise to an energy modulation effect. By measuring the light energy passing through, the physical quantity concerned can be controlled. A variation in the above setup to get the same effect is to employ the fiber Bragg grating as sensor while the long period grating is kept in a constant condition. In the latter case, the reflected Bragg wavelength peak will shift as the quantity to be monitored changes. The same energy modulation effect will occur. To measure the light energy that passes through, a photodiodes circuitry can be employed to convert light into a proportionate voltage.

Figure 1:
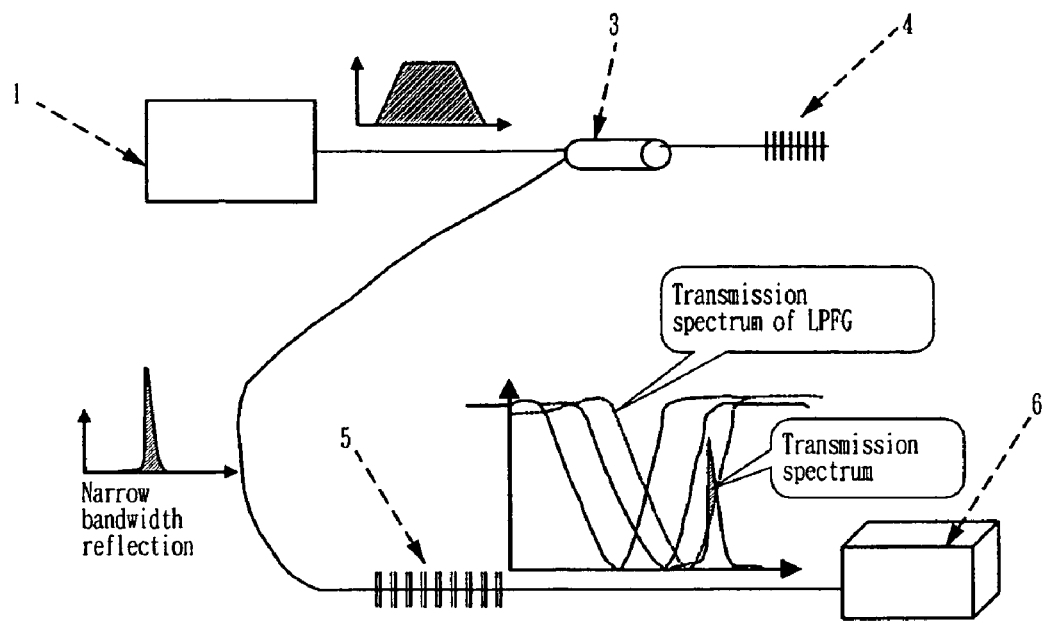
FIG. 1 is a schematic diagram illustrating how a narrow band reflection by a fiber Bragg grating intercept the attenuation spectrum of the long period grating to achieve energy modulation effect.

FIG. 1 is a schematic diagram that shows how the hybrid fiber grating arrangement achieves the energy-modulating effect in this invention. This invention includes four parts: a broad band light source 1, a short period fiber Bragg grating 4, a long period fiber grating 5, and light energy to voltage converter. The broad band light from source 1 is reflected by the short period fiber Bragg grating 4 to form a narrow band light. This is coupled through the long period fiber grating 5 by the coupler 3 to give rise to energy-modulating effect as shown in FIG. 1. The resulting light energy that passes through is transformed by the photodiode circuitry 6 into a proportionate voltage signal. Further, external transducer mechanism can be applied to the fiber grating sensor to increase sensitivity or to allow physical quantities that cannot directly influence the fiber grating 4 to be measurable by the current arrangement.

Figure 2:
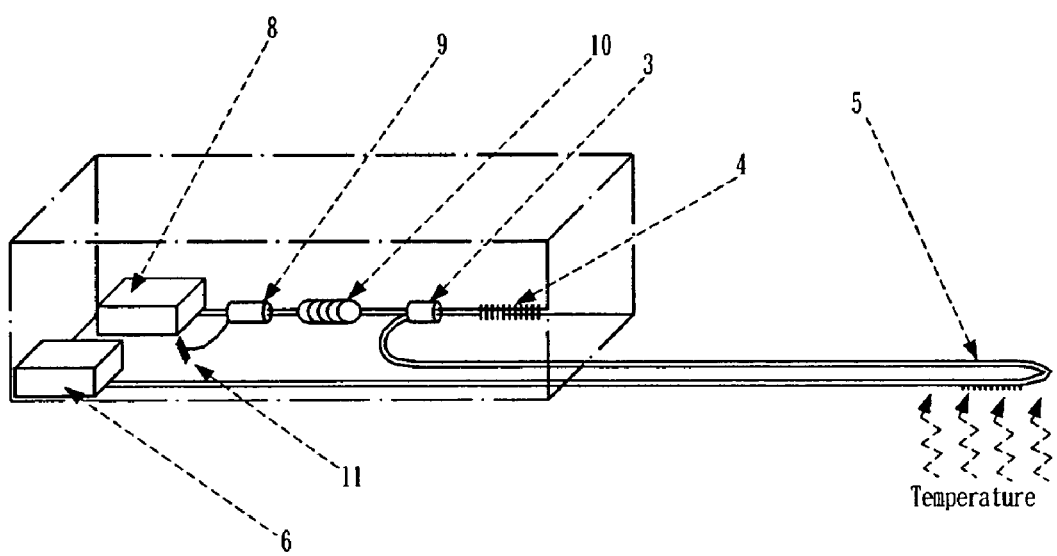
FIG. 2 is a schematic diagram of an embodiment of the present invention using fiber Bragg grating as the sensor.

FIG. 2 shows an embodiment of this invention suitable for measuring temperature. A 980 nm laser light emitted by a laser diode 8 with passes through WDM (wavelength division multiplexer) 9 into EDFA (Erbium Doped Fiber Amplifier) 10 to generate an amplified spontaneous emission. Through the fiber Bragg grating 4, the Bragg wavelength is reflected. Together with mirror 11, a resonance cavity is formed that allow a laser light of wavelength 1542 nm to be excited. This laser light is coupled into the long period fiber grating 5 through the coupler 3.

Figure 4:
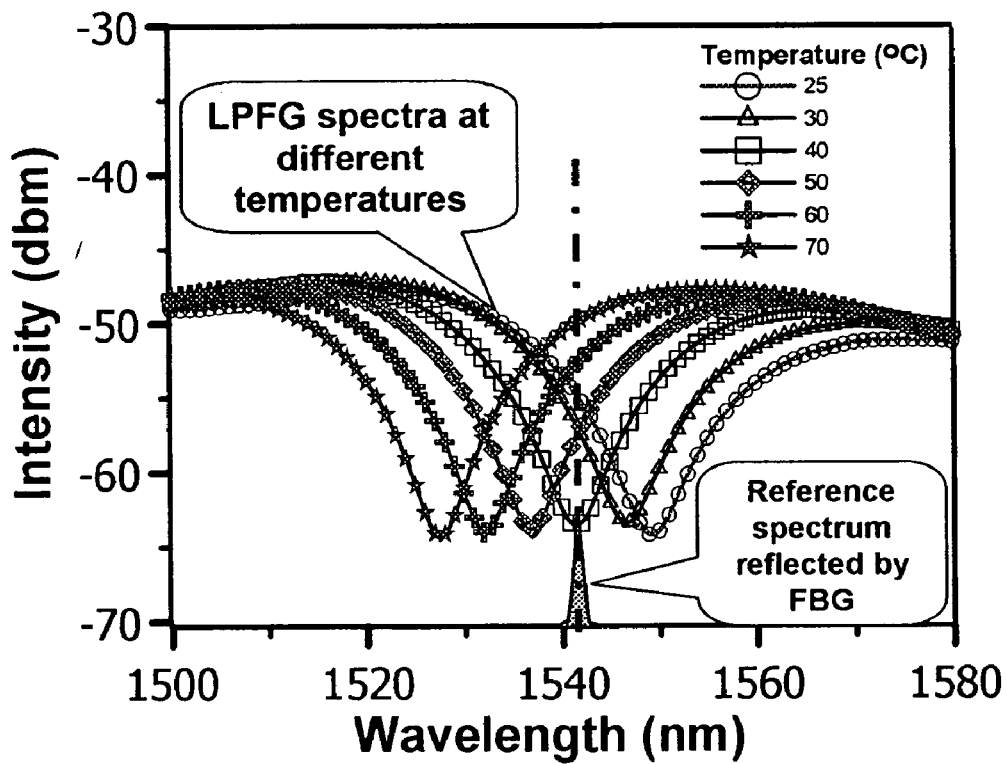
FIG. 4 shows the shift of the long period fiber grating spectrum with temperature relative to a fixed Bragg reflection spectrum.

The long period fiber grating 5 in FIG. 2 is used as the temperature sensing unit in this embodiment. By using the edge filter characteristic of the long period fiber grating, the transmitted light energy is modulated according to the temperature exposed. Experimental data shows a 0.284 nm shift in the attenuation spectrum of the long period grating occurred per ° C. rise in temperature. FIG. 4 shows the shift in attenuation spectrum of the long period fiber grating 5 with temperature.

Figure 5:
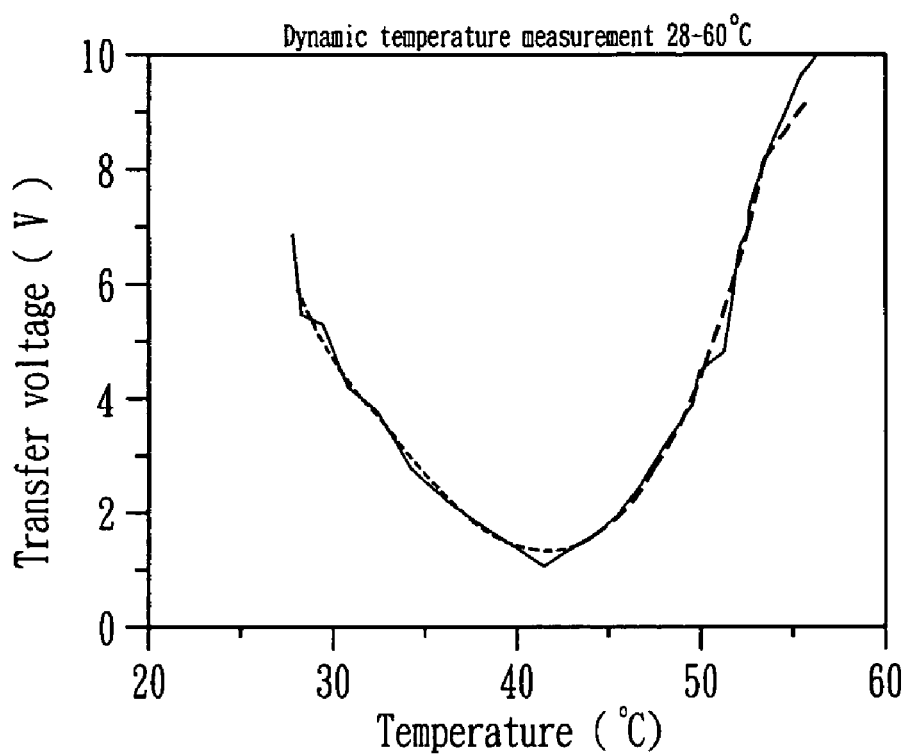
FIG. 5 shows the output from the photodiode circuitry when temperature was measured by an embodiment shown in FIG. 4.

The Photodiode circuitry 6 is primarily used to transform the modulated light energy into electric voltage signal. FIG. 5 shows the resulting voltage with change in temperature. A temperature resolution of 0.01° C. can easily be achieved with the current signal level. Since the sensor is small and dwells in the optical fiber, it can be embedded into the interior of a structure. Its small heat capacity will not affect the local temperature to be measured. This high precision temperature sensor is also resistance to adverse environmental effects. Further, a transducer mechanism 7 can be applied, as shown in FIG. 3, to the long period fiber grating 5 to transform physical quantities to be measured into deformation or temperature, to increase sensitivity or to allow measurement of physical quantities that do not directly influence the long period fiber grating 5.

Figure 3:
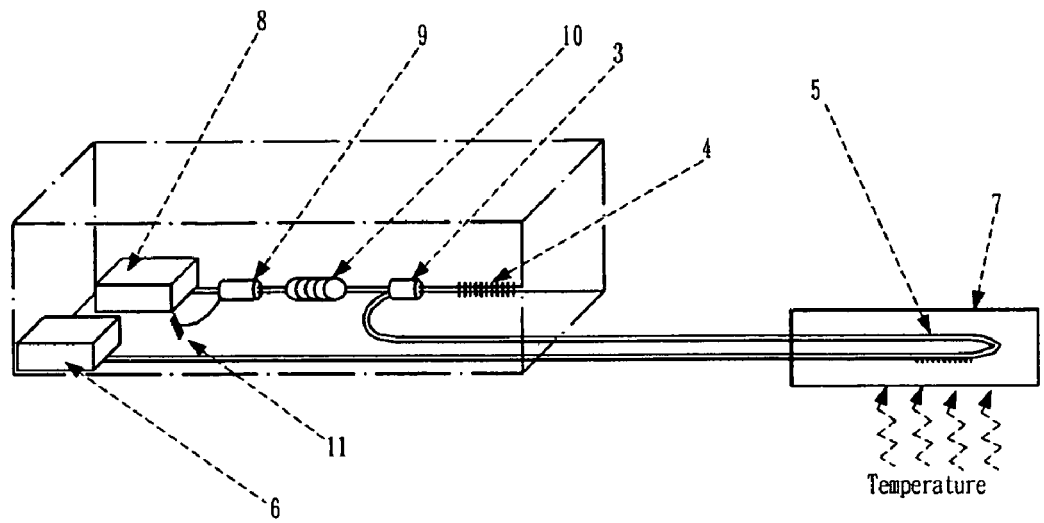
FIG. 3 is a schematic diagram of an embodiment of the present invention using long period grating as the sensor with a transducer mechanism.

Although the above embodiments employed long period fiber grating 5 as temperature sensing device, the methods shown in FIGS. 2 and 3, however, are not limited to measuring temperature. In particular if a periodically etched corrugated long period fiber grating is used, it is especially suited for measuring axial, bending or torsional deformation or similar quantities. Any person skilled in the relative art can understand that this invention can be used to measure axial, bending, or torsion forces by applying suitable transducer to ordinary long period fiber grating 5 or the corrugated long period fiber grating.

Furthermore, the laser light source in FIGS. 2 and 3, which include a laser diode 8, EDFA 10 and fiber Bragg grating 5 can be replaced by other suitable narrow band high intensity laser light source without affecting the operation of this invention.

Fluctuation in the light source 1 intensity obvious will introduce error in the eventual energy measurement by the photodiode circuitry 6.

Figure 6:
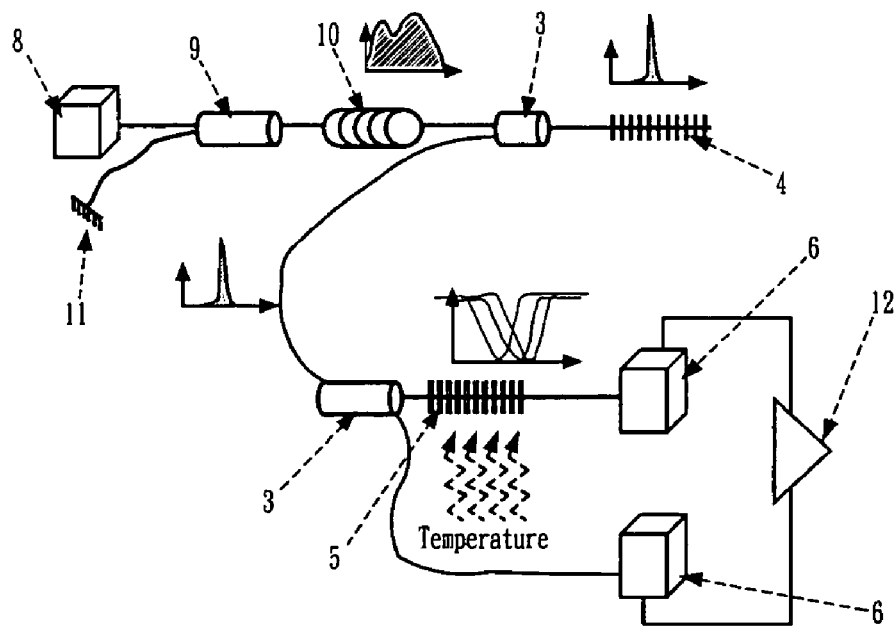
FIG. 6 shows another embodiment of the present invention in which fluctuation of laser source intensity is overcome by normalizing the modulated energy with the source energy using two photodiodes. Long period grating is used as the sensor here.

FIG. 6 shows another embodiment, wherein an additional coupler 3 is employed to channel a portion of un-modulated narrow band light source energy, to perform proportional normalization of the modulated energy. The two streams of energy are measured with two photodiode circuitries 6 and divider 12 is used to normalize the light energy.

Figure 7:
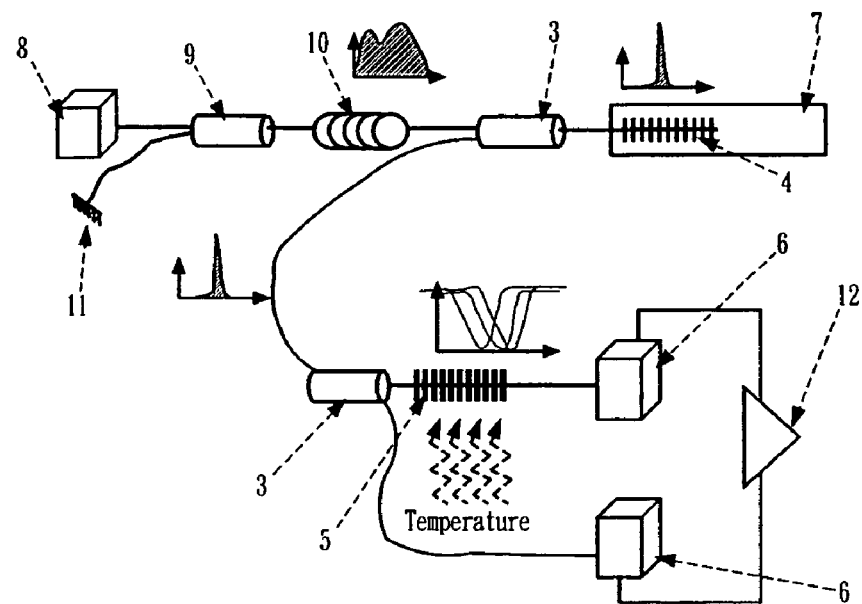
FIG. 7 is a schematic diagram of another embodiment for energy-modulating fiber grating sensor of the present invention, in which light energy will be normalized by two photodiodes and a divider, the resulting measurement will not be affected by variation in the laser light source intensity and a transducer mechanism is added to the fiber Bragg grating sensor.

FIG. 7 also shows another embodiment of energy-modulating fiber grating sensing system in accordance to this invention, wherein a transducer mechanism 7 can be applied to the fiber Bragg grating 5 to transform a physical quantity to be measured into deformation or temperature, and two photodiode circuitries 6 and divider 12 are used to normalize the effect of laser light source 1 intensity fluctuation.

Figure 8:
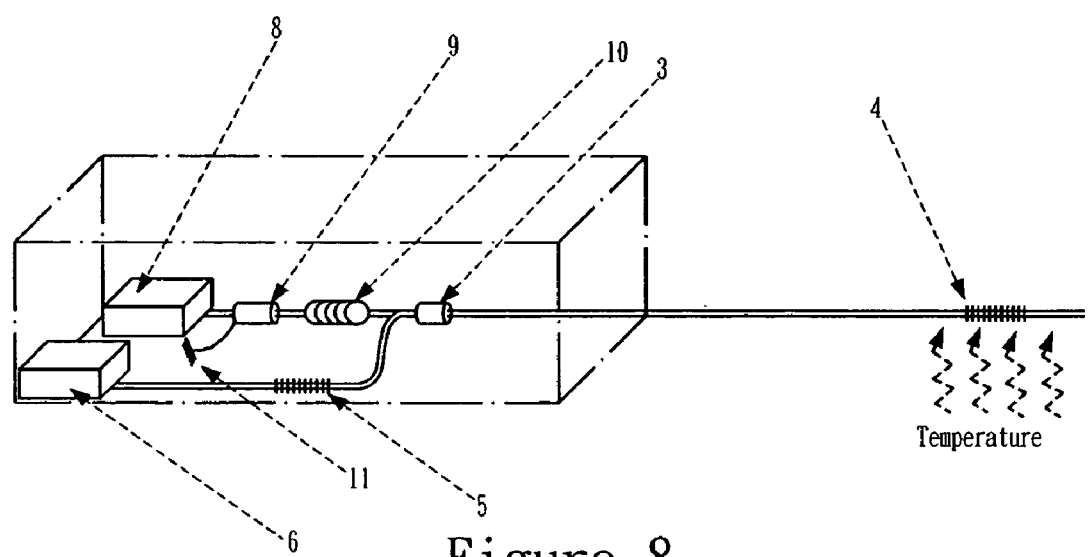
FIG. 8 is a schematic diagram showing the use of the fiber Bragg grating as temperature sensor in the present invention.

FIG. 8 shows yet another embodiment, wherein basic constituting elements are the same with the above embodiments, comprising a laser diode 8 with wavelength 980 nm, narrow band laser high intensity light source including EDFA 10 and fiber Bragg grating 4, a long period fiber grating 5, and a light energy measuring photodiode circuitry 6. The distinction with the above embodiments is that the sensing unit is the short period fiber Bragg grating 4. Fiber Bragg grating 4 has high sensitivity to temperature, and deformation.

Figure 9:
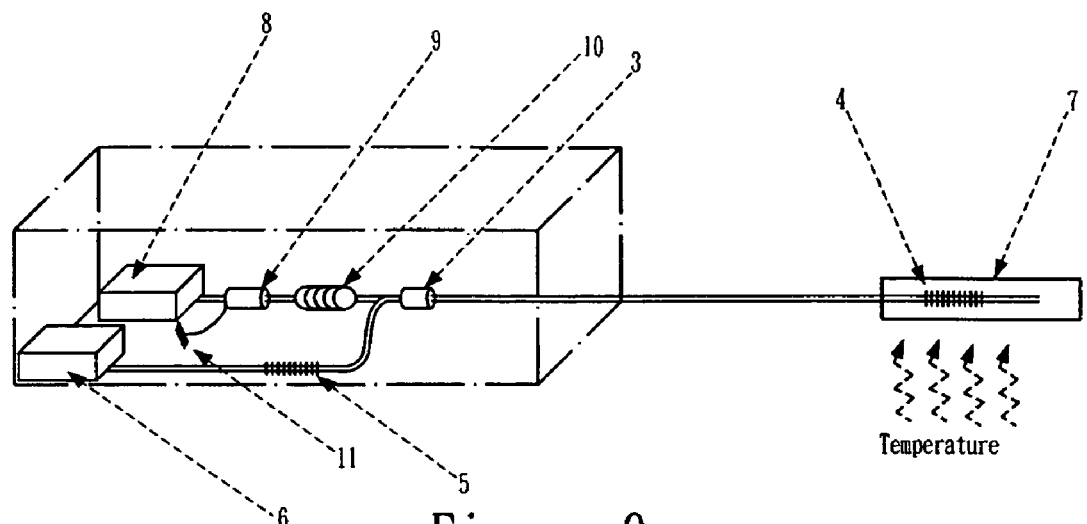
FIG. 9 is a schematic diagram of another embodiment that employs a transducer mechanism on fiber Bragg grating as a temperature sensor.

FIG. 9 still again shows another embodiment, wherein a transducer mechanism 7 is applied to the fiber Bragg grating 4 to transform quantity to be measured into deformation, such that the fiber Bragg grating can be used to measure physical quantity that cannot directly influence it.

Figure 10:
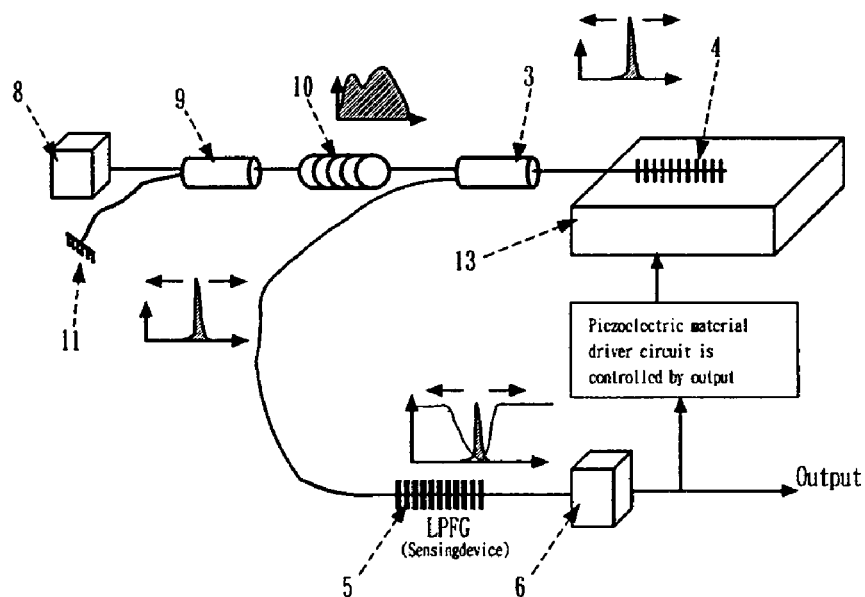
FIG. 10 is a schematic diagram of another embodiment that use a piezoelectric actuator plus a negative feedback loop to control the fiber Bragg grating to lock on to minimum energy throughput.

The range of physical quantity measured is limited by the available relative shift in fiber Bragg grating and long period grating spectra. FIG. 10 shows an embodiment to overcome such limitation. A piezoelectric actuator 13, which is controlled by feedback circuits, is applied to the fiber Bragg grating 4 to control the Bragg wavelength in this embodiment. Piezoelectric actuator is controlled by output of the photodiode in this embodiment to synchronize the attenuation spectrum of the long period fiber grating 5 with the reflected Bragg wavelength of the fiber Bragg grating 4, by locking on to the minimum energy throughput. In this way, the attenuation wavelength of the long period fiber grating 5 can be deduced from the control parameter of the feedback circuit. If the long period grating is employed as physical quantity sensing device, the corresponding physical quantity can be measured not only more conveniently but also with a much wider range.

Figure 11:
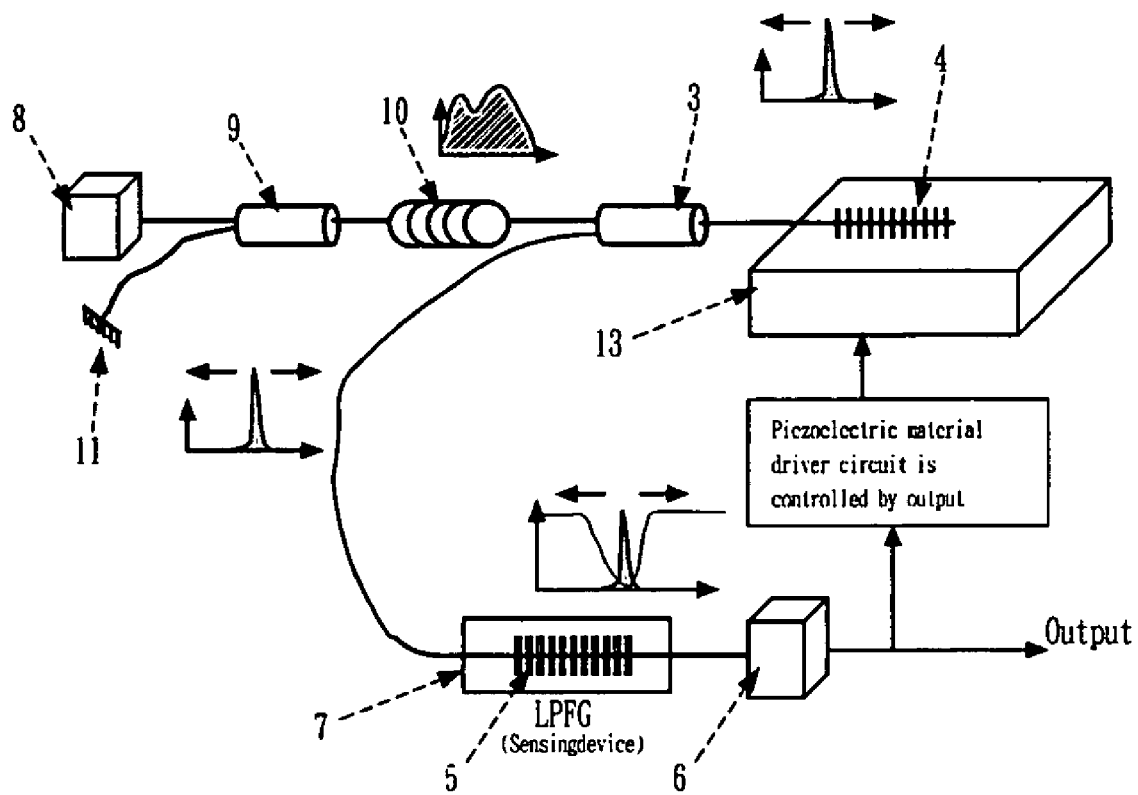
FIG. 11 is a schematic diagram of another embodiment of the present invention, wherein a transducer mechanism is applied to the long period fiber grating to transform the measured physical quantities into deformation or temperature, and a negative feedback circuit of a piezoelectric actuator is employed to control the fiber Bragg grating to lock on to the minimum throughput energy.

FIG. 11 further shows another embodiment of energy-modulating fiber grating sensor in accordance with this invention, wherein a transducer mechanism 7 is applied to the long period fiber grating to transform physical quantities to be measured into deformation or temperature, and a negative feedback circuits involving a piezoelectric actuator 13 is employed to synchronize Bragg wavelength with the attenuation wavelength of the long period fiber grating 5 as described above.

Although specific embodiments have been illustrated and described, it will be obvious to those skilled in the art that various modifications may be made without departing from what is intended to be limited solely by the appended claims.

The invention claimed is:

1. An energy-modulating interrogation system for fiber grating sensor, said system comprising:
   a long period fiber grating to sense physical quantities;
   a broad band light source;
   a fiber Bragg grating used to achieve a characteristic Bragg wavelength reflection;
   a coupler between said broad band light source and said fiber Bragg grating to couple the reflected narrow band Bragg wavelength into said long period fiber grating; and
   a light intensity measuring assembly to measure light energy passing out through said long period fiber grating.

2. The energy-modulating interrogation system for fiber grating sensor according to claim 1, wherein said long period fiber grating is a corrugate external force induced long period fiber grating.

3. The energy-modulating interrogation system for fiber grating sensors according to claim 1, wherein said light intensity measuring assembly is a photodiode that converts modulated transmitted light energy into voltage signal circuitry proportionate to the physical quantities measured.

4. The energy-modulating interrogation system for fiber grating sensors according to claim 1, wherein said board band light source is a laser diode.

5. The energy-modulating interrogation system for fiber grating sensor according to claim 4, further comprising a transducer mechanism to convert the physical quantities to be measured into deformation or temperature and to apply to said long period fiber grating.

6. The energy-modulating interrogation system for fiber grating sensors according to claim 5, further comprising:
   a WDM and an EDFA, wherein said WDM introduces a laser waveguide from said laser diode into said EDFA to generate said broad band light source of amplified spontaneous emission.

7. The energy-modulating interrogation system for fiber grating sensors according to claim 6, further comprising an EDFA between said WDM and said coupler.

8. The energy-modulating interrogation system for fiber grating sensor according to claim 7, wherein a characteristic narrow band spectrum is generated by lasing, in which a laser light with 980 nm wavelength emitted from said laser diode through said WDM, into said EDFA to generate amplified spontaneous emission broad band light, and further through said fiber Bragg grating to reflect a narrow band light, said narrow band light through said coupler to said EDFA and a reflect mirror to form a resonance chamber to trigger laser effect.

9. The energy-modulating interrogation system for fiber grating sensors according to claim 1, wherein a portion of light energy not modulating by said long period fiber grating is channeled by said coupler to normalize the modulated light energy, so that the measured result will not be affected by fluctuation in the laser light source energy.

10. An energy-modulating interrogation system for fiber grating sensor, said system comprising:
    a fiber Bragg grating for sensing physical quantities and for a characteristic Bragg wavelength reflection spectrum corresponding to the said physical quantities measured;
    a broad band light source;
    a long period fiber grating used to modulate reflected light by said fiber Bragg grating;
    a coupler between said broad band light source and said fiber Bragg grating coupling the reflected narrow band Bragg wavelength into said long period fiber grating; and
    a light energy-measuring assembly to measure light energy reflected from said fiber Bragg grating and through said long period fiber grating.

11. The energy-modulating interrogation system for fiber grating sensors according to claim 10, wherein said long period fiber grating is a corrugated external force induced long period fiber grating.

12. The energy-modulating interrogation system for fiber grating sensors according to claim 10, wherein said light energy-measuring assembly is a photodiode that transfers modulated transmitted light energy into voltage signal circuitry proportionate to the light energy throughput.

13. The energy-modulating interrogation system for fiber grating sensors according to claim 10, wherein said broad band light source is a laser diode.

14. The energy-modulating interrogation system for fiber grating sensor according to claim 13, further comprising a transducer mechanism to convert the physical quantities to be measured into deformation or temperature and to apply to said long period fiber grating.

15. The energy-modulating interrogation system for fiber grating sensor according to claim 14, further comprising a WDM and an EDFA, wherein said WDM introduces a laser waveguide from said laser diode into said EDFA to generate said broad band light source of amplified spontaneous emission.

16. The energy-modulating interrogation system for fiber grating sensor according to claim 15, further comprising an EDFA between said WDM and said coupler.

17. The energy-modulating interrogation system for fiber grating sensor according to claim 16, wherein a characteristic wavelength narrow band reflection is generated by a laser light with 980 nm wavelength emitted from said laser diode through said WDM, emitted into said EDFA to generate amplified spontaneous emission wide band light, and further through said fiber Bragg grating to reflect a narrow band light, said narrow band light through said coupler to said EDFA and a reflect mirror to form resonance chamber to trigger laser effect.

18. The energy-modulating interrogation system for fiber grating sensor according to claim 10, wherein a portion of light energy not modulated by said long period fiber grating is channeled by said coupler to normalize the modulated light energy, so that measured result will not be affected by fluctuation in the laser light source energy.

19. An energy-modulating interrogation system for fiber grating sensor, comprising:
    a long period fiber grating for sensing physical quantities;
    a fixed wavelength narrow band light source;
    a light energy-measuring assembly to measure light wave energy from said fixed wavelength narrow light source and through said long period fiber grating;
    a laser diode of a fixed wavelength narrow band laser light source; and a WDM and an EDF, wherein said WDM introduces laser waveguide from said laser diode into an EDFA to generate a broad band light source of amplified spontaneous emission.

20. The energy-modulating interrogation system for fiber grating sensor according to claim 19, further comprising a fixed wavelength narrow band laser light source generated by laser effect, in which a laser light with 980 nm wavelength emitted from said laser diode through said WDM, emitted into said EDFA to generate an amplified spontaneous emission broad band light, and further through said fiber Bragg grating to reflect a narrow band light, said narrow band light through said coupler to said EDFA and a reflecting mirror to form resonance chamber to trigger the laser effect.

21. The energy-modulating interrogation system for fiber grating sensor according to claim 20, further comprising a fiber Bragg grating used to reflect light to form a characteristic wavelength narrow band, said narrow band light through said coupler to an EDFA and a reflect mirror to form resonance chamber to trigger laser effect, generating said fixed wavelength narrow band laser light source.

22. The energy-modulating interrogation system for fiber grating sensor according to claim 21, further comprising a transducer mechanism to transfer physical quantities to be measured into deformation or temperature and apply to said long period fiber grating.

* * * * *